Aug. 7, 1951 B. I. WEINSTEIN ET AL 2,563,766
SAFETY HARNESS
Filed Oct. 18, 1948

INVENTORS
BEATRICE I. WEINSTEIN
BERNARD WEINSTEIN
BY
*Mason + Graham*
ATTORNEYS

Patented Aug. 7, 1951

2,563,766

UNITED STATES PATENT OFFICE 2,563,766

SAFETY HARNESS

Beatrice I. Weinstein and Bernard Weinstein, Los Angeles, Calif., assignors of one-half to Maurice E. Klickstein and Bertha Klickstein, both of Winthrop, Mass.

Application October 18, 1948, Serial No. 55,156

3 Claims. (Cl. 227—49)

1

This invention has to do with safety harness devices for children such as are used to restrain the movements of infants and children within reasonable limits.

The usual type of safety harness includes a belt or waist-circling member and a pair of shoulder straps together with suitable means for detachably securing the parts of the harness about a wearer. The many harnesses we have seen are disadvantageous and fail of their purpose in that they employ buckles, catches or other fastening devices which can be manipulated to an open position by a child and in that very often the shoulder strap construction is such that the child can work loose from the harness. Another disadvantage of many prior devices is that they are relatively complex, being comprised of a multiplicity of straps and buckles and hence are quite difficult to put on and remove.

An object of this invention is to provide a new and improved safety harness especially adapted for infants and children which does not have the disadvantageous features noted above as present in the prior devices.

A particular object of the invention is to provide a simple harness which the child cannot unfasten or slip out of when the harness is worn. In this connection, it is an object to provide a harness which parts at only one portion thereof and which is adapted to be worn with that portion at the back of the child at a point where it is inaccessible to the reach of the child.

A further object of the invention is to provide a harness having an improved shoulder strap construction which is particularly designed to maintain the shoulder straps in proper position on the child and to prevent the child from slipping out of the straps.

Another object of the invention is to provide a safety harness including a belt and a pair of shoulder straps utilizing a single fastening means for unitarily detachably joining the belt and straps together at one portion of the garment.

In this connection it is an object to provide a harness of simple construction, which, once it is adjusted, can be quickly put on or removed and requiring only one simple operation to fasten or unfasten.

Another object of the invention is to provide a safety harness which may be reversed and worn front to back as desired.

These and other objects will be apparent from the drawing and the following description thereof. Referring to the drawing, which is merely illustrative of a preferred embodiment of the invention:

2

More particularly describing the invention, the safety harness comprises generally a belt 10 designed to encircle the waist of the wearer and shoulder straps 11 which extend from the front of the belt to the back thereof and which are adapted to extend over the shoulders of the wearer. For convenience in describing the invention, the portion of the garment indicated by F will be considered the front and the portion indicated by B will be considered as the back of the garment. However it should be understood that the garment is so designed that it may be worn with either part F or part B at the front.

Figure 1:
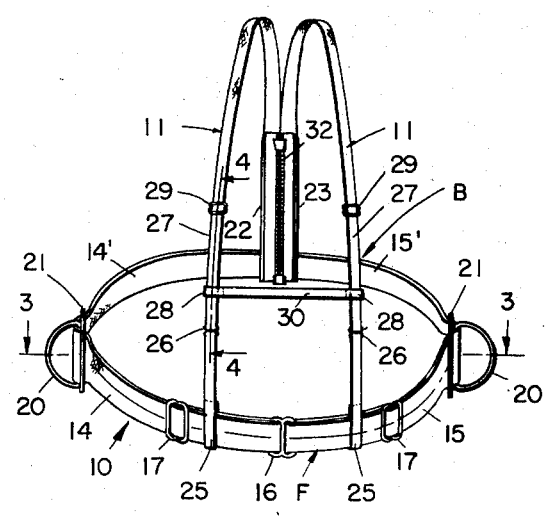
Fig. 1 is a perspective view of a safety harness embodying the invention.
Figure 2:
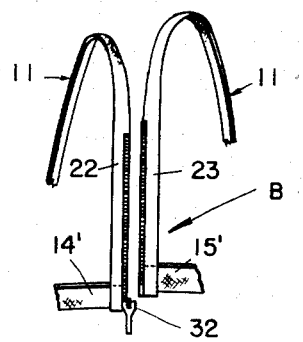
Fig. 2 is a fragmentary elevational view of what will be termed the back of the garment.
Figure 3:
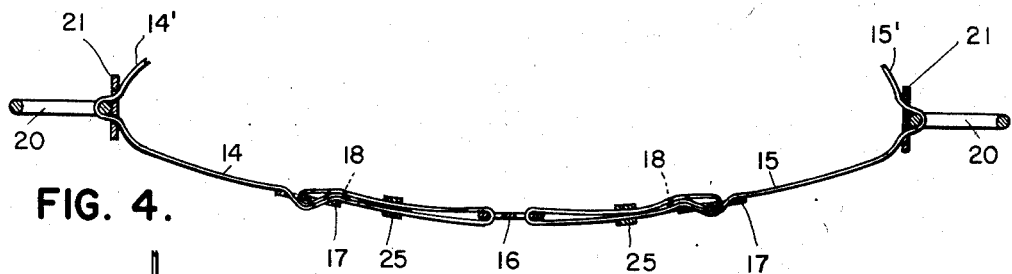
Fig. 3 is a section on line 3—3 of Fig. 1.
Figure 4:
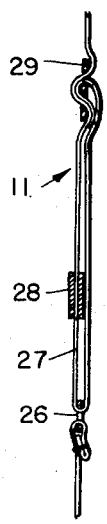
Fig. 4 is a section on line 4—4 of Fig. 1.

The belt 10 is made up of two straps 14 and 15 which may be of webbing or other suitable material. These straps are connected at the front by a slide 16, the straps being looped through the slide as best shown in Fig. 3. The belt straps are each provided with an adjustment slide indicated by 17 and in each case the belt section is looped about the central member of the slide and secured to it as by stitching 18, or other securing means. This provides a means of adjusting the length of the belt which is fool proof in that it cannot be parted.

At each side of the belt there is provided a ring 20 which may be adjustably held at any desired location by means of a slide 21. It will be understood of course, that the rings 20 are to be used in conjunction with auxiliary straps of any conventional type for attaching the harness to a bed, chair, or other object to restrain the movement of the wearer of the harness. By having the rings adjustable along the belt they may be moved to the back of the garment where they may more conveniently act in conjunction with a lead or leash.

The back ends 14' and 15' of the belt straps are sewed or otherwise secured to the lower ends of the back parts 22 and 23 of the shoulder straps 11. The shoulder straps each comprises a front portion which terminates in a loop 25 which encircles the belt. Above the loop each strap is provided with a ring 26 and above this an adjustable section 27 which includes the loop 28 and buckle 29. The loops 28 of the straps are connected by a cross-strap 30 which is adapted to extend across the chest or front of the wearer. This cross-strap is mounted on one section only of the loops 28 and its movement is therefore restricted to the length of the loop. The cross-strap thus securely holds the shoulder straps against greater spacing than the length of the strap, and at the same time the construction prevents the cross-strap from being moved too high where it might choke the wearer, or too low where it would become ineffective to hold the shoulder straps against being slipped off the shoulder of the wearer.

At what has been termed the back of the garment, the shoulder straps converge into back portions 22 and 23, which, as heretofore indicated, are secured to the ends of the belt sections. In addition, the shoulder straps are detachably joined for a limited distance above the belt as by means of a slide fastener 32, which also serves to join the belt ends. In the use of the harness, it will be apparent that once the belt and shoulder straps have been adjusted to the correct size, it is only necessary to fasten or unfasten the slide fastener 32 in order to secure or release the harness. It is contemplated that ordinarily the harness will be worn with the fastener at the back of the child where it will be beyond his reach. However as previously indicated, for example where the infant is so young as to be incapable of operating the slide fastener and is lying on his stomach, it may be more convenient to have the harness worn with the fastener at the front of the infant.

Figure 5:
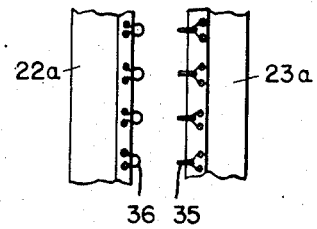
Fig. 5 is a fragmentary view of a modified fastening means.

It is contemplated that various types of fastening means may be used in place of that shown for detachably securing the shoulder straps and attached belt ends together. In Fig. 5, one such means is shown as comprising the hook and eye fasteners, 35—36, on each of the back portions 22a and 23a of the shoulder straps.

Although the invention has been particularly shown and described, it is contemplated that various changes and modifications may be made without departing from the scope of the invention as set forth in the following claims.

We claim:

1. An infant's harness comprising a belt composed of a pair of separate side sections each having a front portion thereof doubled upon itself to provide a loop, means connecting together the loops of the two side sections, means connecting the free end of each loop to the related side section for adjustment along the latter to vary the effective length of the belt, a pair of shoulder straps connected at their front ends to the front part of said belt and united at their rear ends with the rear end portions of said belt side sections, respectively, and interconnectable fastener elements on the rear end portions of said straps for separably connecting the latter and the rear ends of the belt side sections together always in the same definite relationship to each other.

2. An infant's harness comprising a belt composed of a pair of separate side sections each including a front portion doubled upon itself to provide a loop, means permanently connecting the free end of each loop to the related side section for adjustment along the latter to vary the effective length of the side section, means permanently connecting together the loops of said side sections, a pair of shoulder straps each composed of a first and a second section, the first sections of said shoulder straps each including a permanently closed loop, the loops of said first shoulder strap sections being connected to said belt side sections, respectively, for adjustment therealong, the front portions of said second shoulder strap sections each including a portion doubled upon itself to provide a loop, means permanently connecting the free end of each loop to the related second shoulder strap section for adjustment along the latter to vary the effective length of the second shoulder strap section, means permanently connecting together the loop of each second section of each of said shoulder straps and the related first strap section, a breast strap including a pair of permanently closed loops connected to the loops of the second sections of said shoulder straps for adjustment therealong and being limited in such adjustment by the loops of said second shoulder strap sections, the rear end portions of said second shoulder strap sections being united with the rear end portions of said belt side sections, respectively, and interconnectable fastener elements on the rear end portions of said second shoulder strap sections for separably connecting the latter and the rear end portions of the belt side sections together always in the same definite relationship to each other.

3. An infant's harness comprising a belt, a pair of shoudler straps each composed of a first and a second section, the first sections of said shoulder strap each including a permanently closed loop connected to said belt for adjustment therealong, the front portions of said second shoulder strap sections each including a portion doubled upon itself to provide a loop, means permanently connecting the free end of each loop to the related second shoulder strap section for adjustment along the latter to vary the effective length of the second shoulder strap section, means permanently connecting the loop of each second strap section and the related first strap section, a breast strap including a pair of permanently closed loops connected to the loops of said second strap sections for adjustment therealong and being limited in such adjustment thereby, each of the rear end portions of said second shoulder strap sections being united with an end of said belt, and interconnectable fastener elements on the rear end portions of said second shoulder strap sections for separably connecting the latter and the ends of said belt together always in the same definite relationship to each other.

BEATRICE I. WEINSTEIN.
BERNARD WEINSTEIN.

REFERENCES CITED

The following references are of record in the file of this patent:

UNITED STATES PATENTS

| Number | Name | Date |
| --- | --- | --- |
| 786,153 | Richmond | Mar. 28, 1905 |
| 1,684,110 | Pickles | Sept. 11, 1028 |
| 1,749,999 | Crocker | Mar. 11, 1930 |
| 1,930,378 | Beagan | Oct. 10, 1933 |
| 1,964,271 | O'Dwyer | June 26, 1934 |
| 2,302,710 | Nordblom | Nov. 24, 1942 |